(12) United States Patent
Weber

(10) Patent No.: US 8,276,310 B1
(45) Date of Patent: Oct. 2, 2012

(54) ANCHORED FISHING ROD HOLDER ASSEMBLY

(76) Inventor: Michael W. Weber, Eau Claire, WI (US)

( * ) Notice: Subject to any disclaimer, the term of this patent is extended or adjusted under 35 U.S.C. 154(b) by 525 days.

(21) Appl. No.: 12/583,432

(22) Filed: Aug. 20, 2009

(51) Int. Cl.
*A01K 97/10* (2006.01)
*A01K 97/12* (2006.01)

(52) U.S. Cl. .............................. 43/21.2; 43/17
(58) Field of Classification Search ............... 43/21.2, 43/15–17, 19.2, 4.5
See application file for complete search history.

(56) References Cited

U.S. PATENT DOCUMENTS

| | | | |
|---|---|---|---|
| 2,184,192 A | | 12/1939 | McCline et al. |
| 2,311,823 A | | 2/1943 | Gaskill |
| 2,557,728 A | * | 6/1951 | Drumb ........................ 248/540 |
| 2,618,090 A | * | 11/1952 | Kimura ............................ 43/15 |
| 2,650,052 A | * | 8/1953 | Bintz ............................ 43/21.2 |
| 2,663,962 A | * | 12/1953 | King ................................ 43/17 |
| 2,773,326 A | * | 12/1956 | Calvert ............................ 43/16 |
| 2,803,912 A | * | 8/1957 | Kellar ............................. 43/16 |
| 2,871,614 A | * | 2/1959 | Roff ................................ 43/15 |
| 2,899,155 A | * | 8/1959 | Rogers .......................... 43/21.2 |
| 2,934,849 A | * | 5/1960 | Kampa ............................ 43/17 |
| 3,034,247 A | * | 5/1962 | Lunsman ....................... 43/21.2 |
| 3,187,456 A | * | 6/1965 | Apitz ............................... 43/17 |
| 3,309,808 A | * | 3/1967 | George, Sr. ..................... 43/15 |
| 3,394,484 A | * | 7/1968 | Sonoski ............................ 43/16 |
| 3,516,190 A | * | 6/1970 | Cook ............................ 43/21.2 |
| 3,584,408 A | * | 6/1971 | Frick ............................ 43/21.2 |
| 3,603,017 A | * | 9/1971 | Happe ........................... 43/21.2 |
| 3,824,730 A | * | 7/1974 | Johnson ........................... 43/17 |
| 4,033,062 A | * | 7/1977 | Denecky ....................... 43/21.2 |
| 4,043,070 A | * | 8/1977 | Lamothe ....................... 43/21.2 |
| 4,161,839 A | * | 7/1979 | Ward ............................. 43/21.2 |
| 4,244,132 A | * | 1/1981 | Hoffman et al. .............. 43/21.2 |
| 4,486,968 A | * | 12/1984 | Gould ........................... 43/21.2 |
| 4,620,387 A | * | 11/1986 | Bloom ............................. 43/17 |
| 4,642,930 A | * | 2/1987 | Graf ............................. 43/19.2 |
| 4,676,019 A | * | 6/1987 | Engles .......................... 43/21.2 |
| 4,694,603 A | * | 9/1987 | Anderson ..................... 43/21.2 |
| 4,763,435 A | * | 8/1988 | Deering ........................ 43/21.2 |
| 4,837,965 A | * | 6/1989 | True ................................ 43/17 |
| 4,949,498 A | * | 8/1990 | Cecchetti ...................... 43/21.2 |
| 5,038,511 A | * | 8/1991 | Gessner ........................ 43/21.2 |
| 5,050,333 A | * | 9/1991 | Debreczeni ...................... 43/17 |
| 5,367,815 A | * | 11/1994 | Liou ............................. 43/21.2 |
| 5,560,137 A | * | 10/1996 | Herring ........................ 43/21.2 |

(Continued)

FOREIGN PATENT DOCUMENTS

FR 2557423 A1 * 7/1985

(Continued)

*Primary Examiner* — Darren W Ark
(74) *Attorney, Agent, or Firm* — Tipton L. Randall

(57) ABSTRACT

A fishing rod holder includes a central shaft with telescoping sections and a pair of support legs secured adjacent the first end thereof. A third support leg attached to the central shaft provides further supports. A rod support arm is pivotally secured within a vertical slot in the second end of the central shaft. A second end of the rod support arm includes a forked end with finger sections. A T-shaped hanger supported by the forked end has a central leg section pivotally secured to a strap that engages the handle of a fishing pole. The fishing pole is free to pivot up and down relative to the T-shaped hanger. Raising the fishing pole disengages the T-shaped hanger from the support arm, thereby pivoting the rod support arm to a vertical orientation. An anchor further secures the central shaft to a support surface.

18 Claims, 7 Drawing Sheets

U.S. PATENT DOCUMENTS

| | | | |
|---|---|---|---|
| 5,571,228 A | 11/1996 | McMurtrie | |
| 5,910,004 A * | 6/1999 | Antosh | 43/21.2 |
| 5,941,015 A * | 8/1999 | Jenkins | 43/21.2 |
| 5,987,801 A * | 11/1999 | Anderson | 43/17 |
| 5,992,080 A * | 11/1999 | Allen | 43/19.2 |
| 6,024,318 A * | 2/2000 | Barry | 43/17 |
| 6,079,142 A * | 6/2000 | Danser et al. | 43/17 |
| 6,088,946 A * | 7/2000 | Simmons | 43/21.2 |
| 6,129,251 A * | 10/2000 | Lajoie | 43/21.2 |
| 6,185,855 B1 * | 2/2001 | Sizer et al. | 43/21.2 |
| 6,463,691 B1 * | 10/2002 | Atkins | 43/17 |
| 6,484,433 B1 * | 11/2002 | Greene | 43/21.2 |
| 6,594,941 B1 * | 7/2003 | Anderson | 43/17 |
| 6,622,421 B1 * | 9/2003 | Daniels | 43/21.2 |
| 6,643,974 B2 | 11/2003 | Ruiz et al. | |
| 6,817,136 B2 * | 11/2004 | Novak | 43/21.2 |
| 7,089,699 B2 | 8/2006 | Borgeat | |
| 7,213,361 B1 * | 5/2007 | Perigo, Sr. | 43/21.2 |
| 7,213,362 B1 * | 5/2007 | Weber et al. | 43/21.2 |
| 7,272,909 B2 * | 9/2007 | Weber et al. | 43/21.2 |
| 7,316,094 B1 * | 1/2008 | Bishop | 43/15 |
| 7,322,148 B2 | 1/2008 | Coulman | |
| 7,377,069 B2 * | 5/2008 | Morris | 43/21.2 |
| 7,395,628 B2 * | 7/2008 | Rayfield | 43/21.2 |
| 7,594,354 B1 * | 9/2009 | Chadwick | 43/21.2 |
| 7,841,125 B2 * | 11/2010 | Foss | 43/21.2 |
| 2001/0047607 A1 * | 12/2001 | Harvanek | 43/21.2 |
| 2005/0138856 A1 * | 6/2005 | Hansen | 43/21.2 |
| 2006/0265933 A1 * | 11/2006 | Knock | 43/21.2 |
| 2010/0122487 A1 * | 5/2010 | Snider | 43/21.2 |
| 2011/0107652 A1 * | 5/2011 | Getzinger | 43/19.2 |
| 2012/0131841 A1 * | 5/2012 | Galbraith | 43/17 |

FOREIGN PATENT DOCUMENTS

| | | | |
|---|---|---|---|
| FR | 2885487 A1 * | 11/2006 | |
| GB | 2177882 A * | 2/1987 | |
| GB | 2269518 A * | 2/1994 | |
| GB | 2313030 A * | 11/1997 | |
| GB | 2376399 A * | 12/2002 | |
| GB | 2399266 A * | 9/2004 | |
| JP | 01051035 A * | 2/1989 | |
| JP | 05015284 A * | 1/1993 | |
| JP | 07099871 A * | 4/1995 | |
| JP | 07289136 A * | 11/1995 | |
| JP | 10201406 A * | 8/1998 | |
| JP | 2001045943 A * | 2/2001 | |
| JP | 2003009743 A * | 1/2003 | |
| JP | 2004089104 A * | 3/2004 | |
| JP | 2006042718 A * | 2/2006 | |
| JP | 2007151421 A * | 6/2007 | |
| JP | 2009136270 A * | 6/2009 | |
| WO | WO 2007091861 A1 * | 8/2007 | |

* cited by examiner

ANCHORED FISHING ROD HOLDER ASSEMBLY

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a fishing rod holder and, more particularly, to a fishing rod holder that can be anchored to a support surface and, most particularly, to an anchored fishing rod holder that supports a fishing rod in a horizontal orientation and allows the fisherman to readily grasp the fishing pole to set the hook when a fish bite is detected.

2. Background Information

When fishing with a rod and reel combination, the angler may wish to have a safe and efficient way to maintain his fishing line and bait in the water, yet not be required to hold the rod and reel combination in his hands. The classic example of a support for a rod and reel combination is simply a forked stick inserted into the ground to support the rod and reel combination at about a 45-degree angle. Although functional for warm weather fishing, the forked stick device is not suitable for use when ice fishing through a hole in the ice. Various devices are used to support a rod and reel combination adjacent to an ice fishing hole with the line extending down the hole with a baited hook attached to it. Patents have been granted for several of these devices, including the following: U.S. Pat. No. 1,831,190 by Parker; U.S. Pat. No. 2,744,351 by Smith; U.S. Pat. No. 2,804,277 by Kinder; U.S. Pat. No. 2,811,801 by Daniel; U.S. Pat. No. 2,918,746 by Hamrick; U.S. Pat. No. 2,964,868 by Bennett; U.S. Pat. No. 3,170,262 by Hall; U.S. Pat. No. 3,973,346 by Mason; U.S. Pat. No. 3,992,798 by Schmitt, Sr.; U.S. Pat. No. 4,004,365 by Manchester; U.S. Pat. No. 4,031,651 by Titze; U.S. Pat. No. 4,142,315 by Hoffman; U.S. Pat. No. 4,177,595 by Chon; U.S. Pat. No. 4,344,248 by Trophy, Sr. et al.; U.S. Pat. No. 4,407,089 by Miller; U.S. Pat. No. 4,866,873 by Van Valkenburg; U.S. Pat. No. 5,038,511 by Gessner; U.S. Pat. No. 5,119,580 by Schulte et al.; U.S. Pat. No. 5,501,028 by Hull et al.; U.S. Pat. No. 5,571,228 by McMurtrie; U.S. Pat. No. 5,613,318 by Hislop; U.S. Pat. No. 5,934,004 by Koe; U.S. Pat. No. 6,129,251 by Lajoie; U.S. Pat. No. 6,196,513 by Edwards et al.; U.S. Pat. No. 6,643,974 by Ruiz et al., and U.S. Pat. No. 6,802,150 by Harden. These devices have their shortcomings which impede a quick response by the angler when a fish bites the bait.

Applicants have devised a rod and reel combination support stand assembly that securely holds the rod in approximately a horizontal position and releases the rod from the support stand assembly instantaneously when the angler grasps the rod in response to a fish biting the bait.

SUMMARY OF THE INVENTION

The invention is directed to a fishing rod holder assembly for supporting a fishing rod in a horizontal orientation. The fishing rod holder assembly includes a linear, central shaft member having first and second ends. First and second adjustable, nonlinear, support leg members are secured in mutual opposition adjacent the first end of the central shaft member. The support leg members maintain the central shaft member in a non-vertical orientation. A third support leg member is pivotally attached at about a midpoint of the central shaft member and is extendable to contact a support surface between the first and second support leg members. A rod support arm member is pivotally secured at a first end within a vertical slot in the second end of the central shaft member. A second end of the rod support arm member includes a forked end with finger sections in a plane essentially perpendicular to the vertical slot of the central shaft member. A T-shaped hanger member is supported by the forked end of the support arm member with a central leg section extending vertically there below. The central leg section of the hanger member is pivotally secured to a strap member adapted for engaging a handle of a fishing pole. A fishing pole is pivotally secured by the strap member to the central leg section of the T-shaped hanger member supported by the forked end of the support arm member. The fishing pole held in a horizontal orientation is free to pivot up and down relative to the T-shaped hanger member. A fisherman, grasping the fishing pole in response to a fish biting the bait, raises the fishing pole, thereby disengaging the T-shaped hanger member from the forked end of the support arm member and pivoting the rod support arm member to a vertical orientation.

In a preferred embodiment of the invention, the fishing rod holder includes a linear, central shaft member including at least two telescoping sections and having first and second ends. First and second adjustable, nonlinear, support leg members are secured in mutual opposition adjacent the first end of the central shaft member. The support leg members maintain the central shaft member in a non-vertical orientation. A third support leg member is pivotally attached at about a midpoint of the central shaft member and is extendable to contact a support surface between the first and second support leg members. A rod support arm member is pivotally secured at a first, planar end within a vertical slot in an offset section of the second end of the central shaft member. A second end of the rod support arm member is planar and perpendicular to the first planar end thereof, and includes a forked end with finger sections therein. An anchoring member with a threaded end inserted through an aperture in the first end of the central shaft member secures the first end of the central shaft member to a support surface. A T-shaped hanger member is supported by the forked end of the support arm member, with a central leg section extending vertically there below. The central leg section of the hanger member is pivotally secured to a strap member adapted for engaging a handle of a fishing pole. A fishing pole is pivotally secured by the strap member to the central leg section of the T-shaped hanger member supported by the forked end of the support arm member. The fishing pole held in a horizontal orientation is free to pivot up and down relative to the T-shaped hanger member. A fisherman, grasping the fishing pole in response to a fish biting the bait, raises the fishing pole, thereby disengaging the T-shaped hanger member from the forked end of the support arm member and pivoting the rod support arm member to a vertical orientation.

DESCRIPTION OF THE EMBODIMENTS

Figure 1:
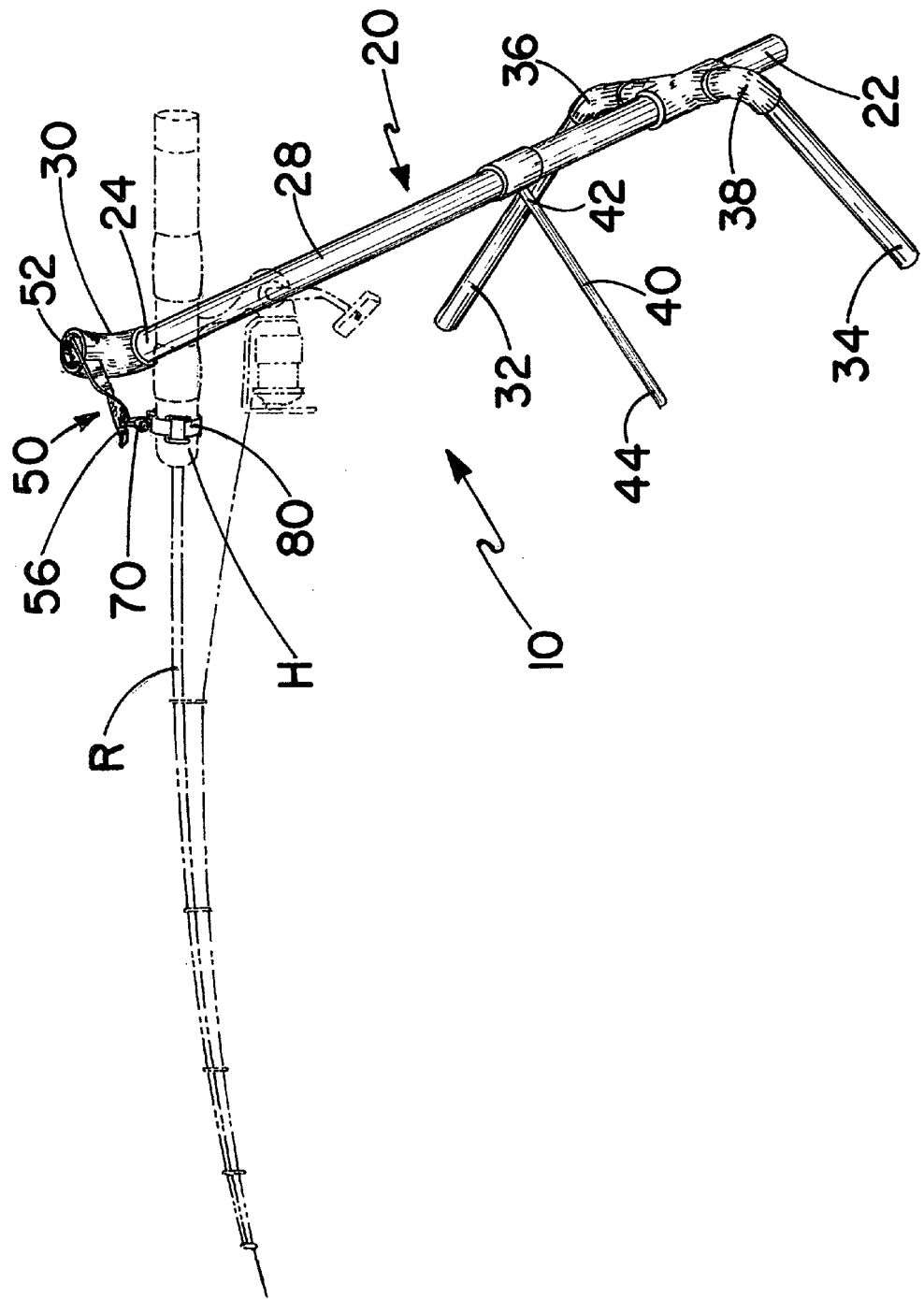
FIG. 1 is a perspective side view of the fishing rod holder assembly of the present invention supporting a fishing rod and reel combination.

| | Nomenclature |
|---|---|
| 10 | Fishing Rod Holder Assembly |
| 20 | Linear Central Shaft Member |
| 22 | First End of Shaft Member |
| 24 | Second End of Shaft Member |
| 26 | First Telescoping Section |
| 28 | Second Telescoping Section |
| 30 | Offset End Section of Shaft Member |
| 32 | First Support Leg Member |
| 34 | Second Support Leg Member |
| 36 | Elbow Joint of Support Leg Member |
| 38 | Elbow Joint of Support Leg Member |
| 40 | Third Support Leg Member |
| 42 | First End of Third Leg Member |
| 44 | Second End of Third Leg Member |
| 46 | Pivoting Connector Member |
| 50 | Rod Support Arm Member |
| 52 | First End of Rod Support Arm Member |
| 54 | Second End of Rod Support Arm Member |
| 56 | Forked Second End of Arm Member |
| 58 | Finger Sections of Forked Second End |
| 60 | Vertical Slot in Central Shaft Member |
| 65 | Shaft Member of Offset End Section |
| 70 | T-Shaped Hanger Member |
| 72 | Cross Bar Section |
| 74 | Central Leg Section |
| 76 | Aperture in Central Leg Section |
| 80 | Strap Member |
| 82 | Connector Unit |
| 84 | Pivot Pin of Connector Unit |
| 90 | Anchoring Member |
| 92 | Threaded End of Anchoring Member |
| 94 | Handle End of Anchoring Member |
| 98 | Aperture in First End of Central Shaft Member |
| H | Handle Portion of Fishing Rod |
| R | Rod Portion of Fishing Rod |

Construction

The invention is a fishing rod holder assembly for supporting a fishing rod in a horizontal orientation. The fishing rod holder assembly comprises a linear, central shaft member including at least two telescoping sections and having first and second ends. First and second adjustable, nonlinear, support leg members are secured in mutual opposition adjacent the first end of the central shaft member. The support leg members maintain the central shaft member in a non-vertical orientation. A third support leg member is pivotally attached at about a midpoint of the central shaft member and is extendable to contact a support surface between the first and second support leg members. A rod support arm member is pivotally secured at a first, planar end within a vertical slot in an offset section of the second end of the central shaft member. A second end of the rod support arm member is planar and perpendicular to the first planar end thereof, and includes a forked end with finger sections therein. An anchoring member with a threaded end inserted through an aperture in the first end of the central shaft member secures the first end of the central shaft member to a support surface. A T-shaped hanger member is supported by the forked end of the support arm member, with a central leg section extending vertically there below. The central leg section of the hanger member is pivotally secured to a strap member, adapted for engaging a handle of a fishing pole. A fishing pole is pivotally secured by the strap member to the central leg section of the T-shaped hanger member supported by the forked end of the support arm member. The fishing pole, held in a horizontal orientation, is free to pivot up and down relative to the T-shaped hanger member. A fisherman, grasping the fishing pole in response to a fish biting the bait, raises the fishing pole, thereby disengaging the T-shaped hanger member from the forked end of the support arm member and pivoting the rod support arm member to a vertical orientation.

Figure 2:
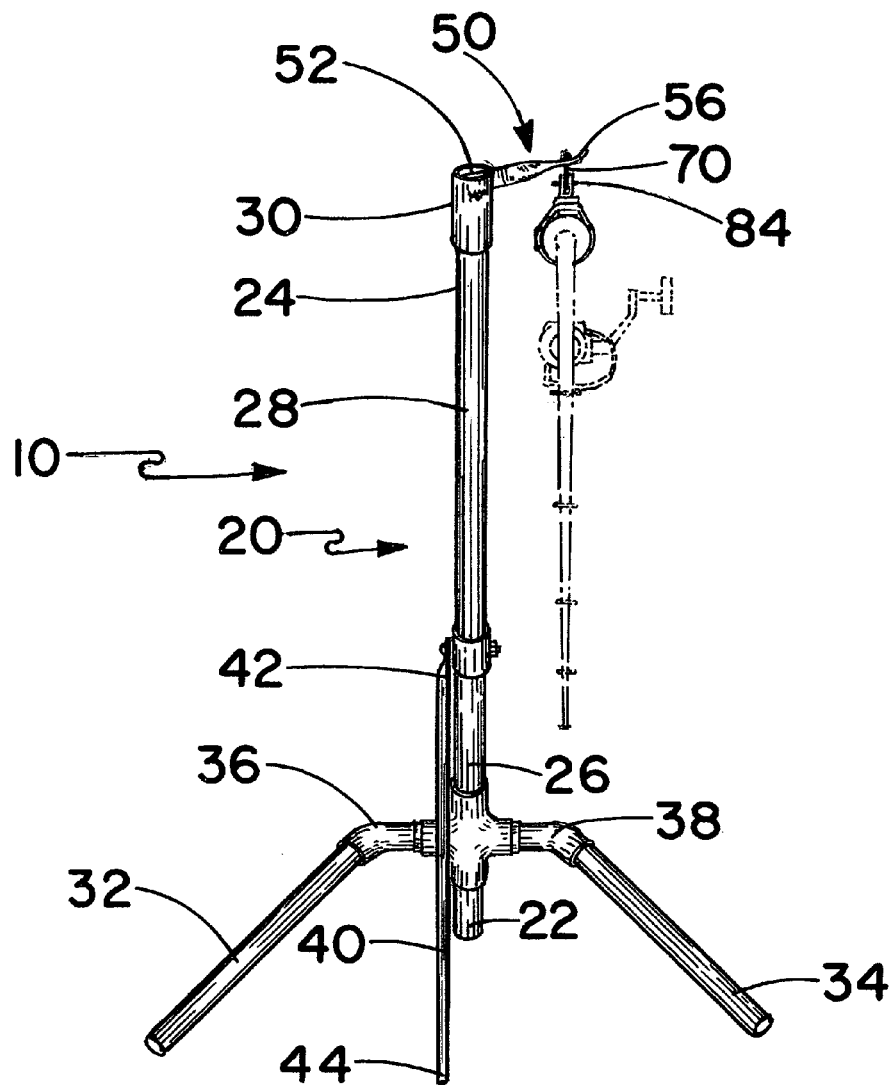
FIG. 2 is a perspective front view of the fishing rod holder assembly of the present invention supporting a fishing rod and reel combination.
Figure 3:
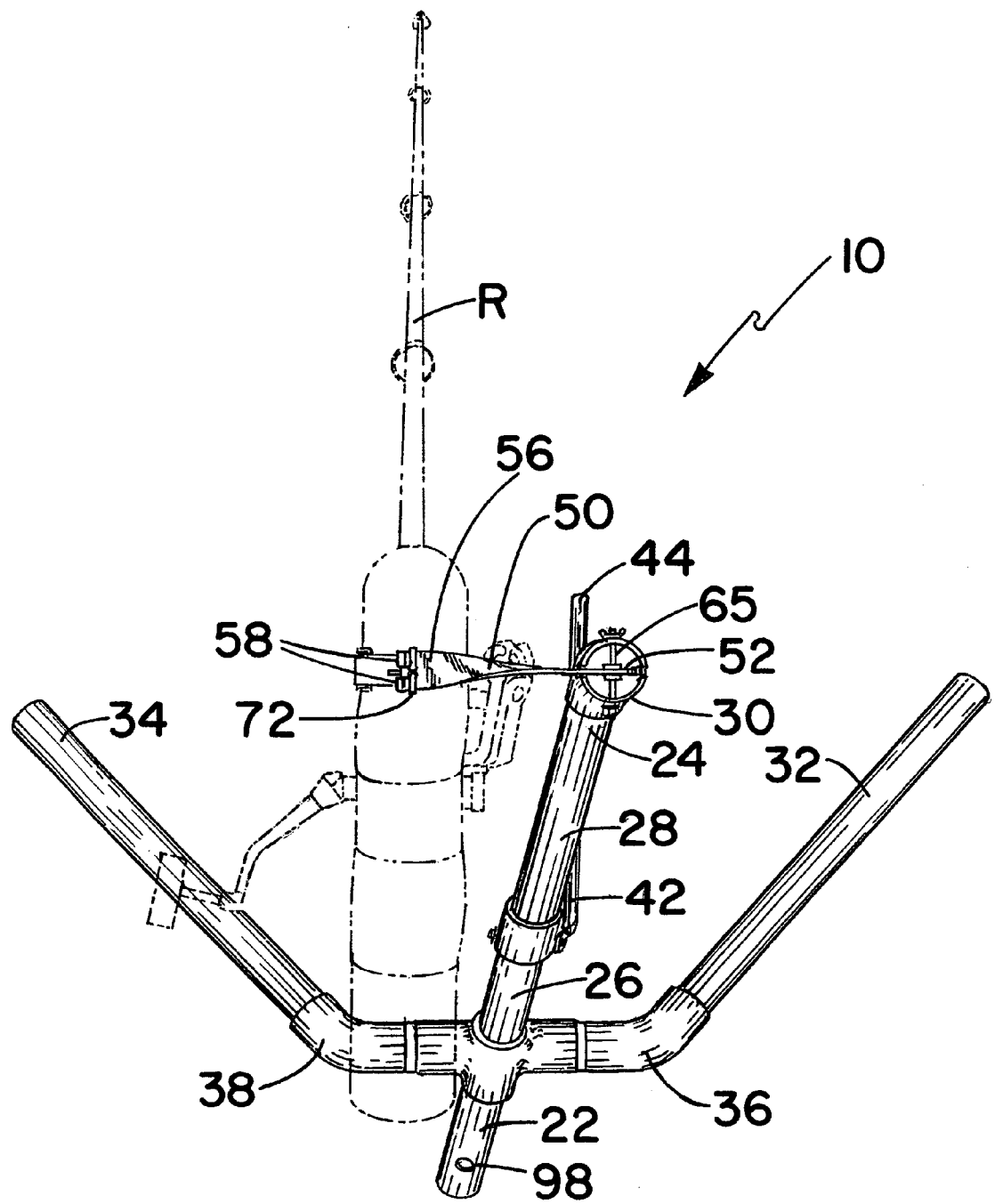
FIG. 3 is a top perspective view of the fishing rod holder assembly of the present invention supporting a fishing rod and reel combination.

Referring now to FIGS. 1-3, several perspective views of the fishing rod holder assembly 10 of the present invention are shown. The fishing rod holder assembly 10 includes a linear, central shaft member 20, having a first end 22 and a second end 24. Preferably, the central shaft member 20 includes at least two telescoping sections, allowing variation of the height of the fishing rod holder assembly 10 by the user. In the embodiment shown in FIGS. 1-3, the central shaft member 20 includes a first telescoping section 26 and a second telescoping section 28. First and second adjustable, nonlinear, support leg members 32, 34 are secured to the central shaft member 20 and oriented in mutual opposition adjacent the first end 22 thereof. The support leg members 32, 34 maintain the central shaft member 20 in a non-vertical orientation, as illustrated in FIGS. 1-3. Preferably, the support leg members 32, 34 each contain an independently adjustable elbow section 36, 38, with each elbow section 36, 38 slightly spaced apart from the central shaft member 20. Thus, the portion of the support leg members 32, 34 beyond the elbow sections 36, 38 can be adjusted relative to the central shaft member 20 to hold the shaft member 20 in the desired, non-vertical orientation and to compensate for an uneven support surface. The central shaft member 20 and the support leg members 32, 34 are preferably fabricated from commercially available PVC pipe and PVC fittings for light weight and durability.

A third support leg member 40 is pivotally attached at about a midpoint of the linear central shaft member 20. It is extendable to contact a support surface between the first and second support leg members 32, 34 and provides a stable base structure supporting the central shaft member 20 in a non-vertical orientation. The central shaft member 20 contains an offset section 30 at the second end 24 thereof. The offset section 30 provides the second end 24 of the central shaft member 20 with a portion that is essentially perpendicular and vertical to the support surface on which the fishing rod holder assembly 10 rests.

Figure 7:
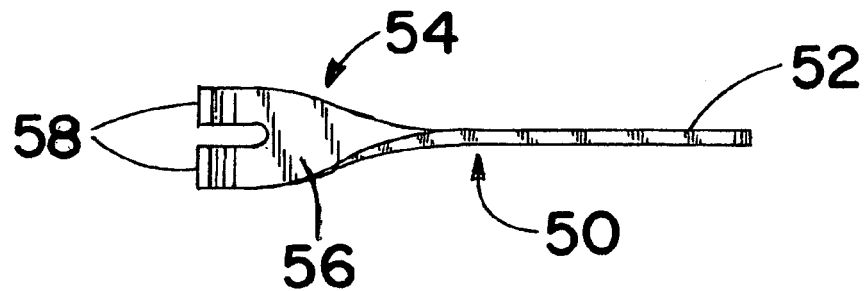
FIG. 7 is a top view of the rod support arm member of the fishing rod holder assembly of the present invention.
Figure 8:
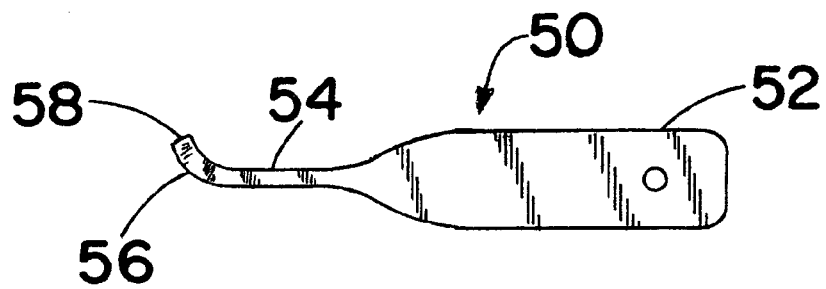
FIG. 8 is a side view of the rod support arm member of the fishing rod holder assembly of the present invention.
Figure 9:
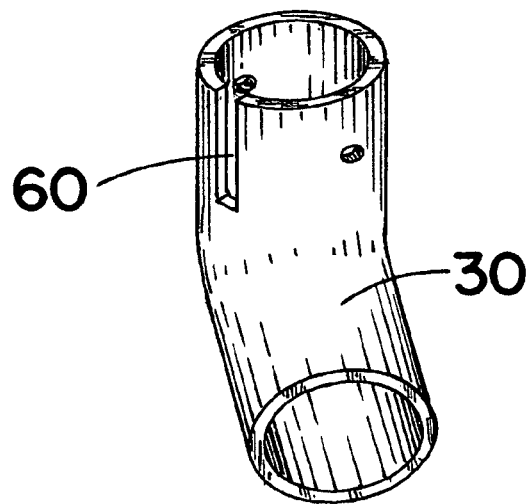
FIG. 9 is a perspective view of the offset end section of the central shaft member of the fishing rod holder assembly of the present invention.

A rod support arm member 50 is pivotally secured at a first, planar end 52 within a vertical slot 60 in the offset end section 30 at the second end 24 of the central shaft member 20. A second end 54 of the rod support arm member 50 is also planar and oriented perpendicular to the first planar end 52 thereof. The second end 54 includes a forked end 56 with finger sections 58 therein. Several views of the rod support arm member 50 and the vertical slot 60 in the offset end section 30 at the second end 24 of the central shaft member 20 are shown in FIGS. 7-9. Preferably, the offset end section 30 at the second end 24 of the central shaft member 20 is hollow, with the vertical slot 60 extending downwardly from the open top end thereof, as shown in FIG. 9. The first end 52 of the rod support arm member 50 is pivotally secured within the vertical slot 60 by a shaft member 65 that traverses the offset end section 30, adjacent the vertical slot 60 therein.

Figure 4:
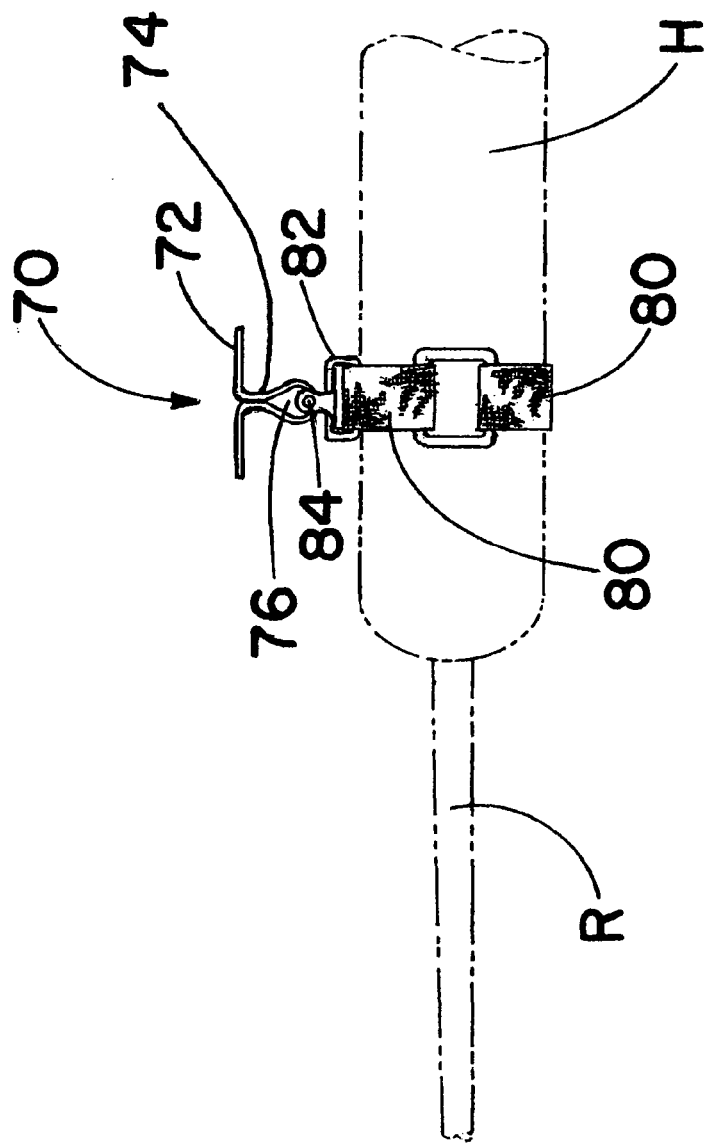
FIG. 4 is a perspective side view of the strap member and T-shaped hanger member of the present invention secured to the handle of a fishing rod.

Referring now to FIGS. 3 and 4, a T-shaped hanger member 70 is supported by the forked end 56 of the rod support arm member 50. The cross bar section 72 of the T-shaped hanger member 70 rests atop the forked end 56 of the rod support arm member 50, with a central leg section 74 extending vertically there below, between the finger sections 58. The central leg section 74 of the hanger member 70 is pivotally secured to a strap member 80, adapted for engaging a handle H of a fishing pole. Preferably, the strap member 80 is fabricated of hook and loop tape for ease of adjustability. The strap member 80 includes a connector unit 82, containing a pivot pin 84 that mounts within an aperture 76 near the end of the central leg section 74 opposite the cross bar section 72. Most preferably, the finger sections 58 of the forked second end 56 of the rod support arm member 50 curve upwardly (FIG. 8) to retain the T-shaped hanger member 70 there upon. The curvature of the finger sections 58 allows a degree of horizontal movement the fishing rod, as may occur under windy conditions.

Figure 5:
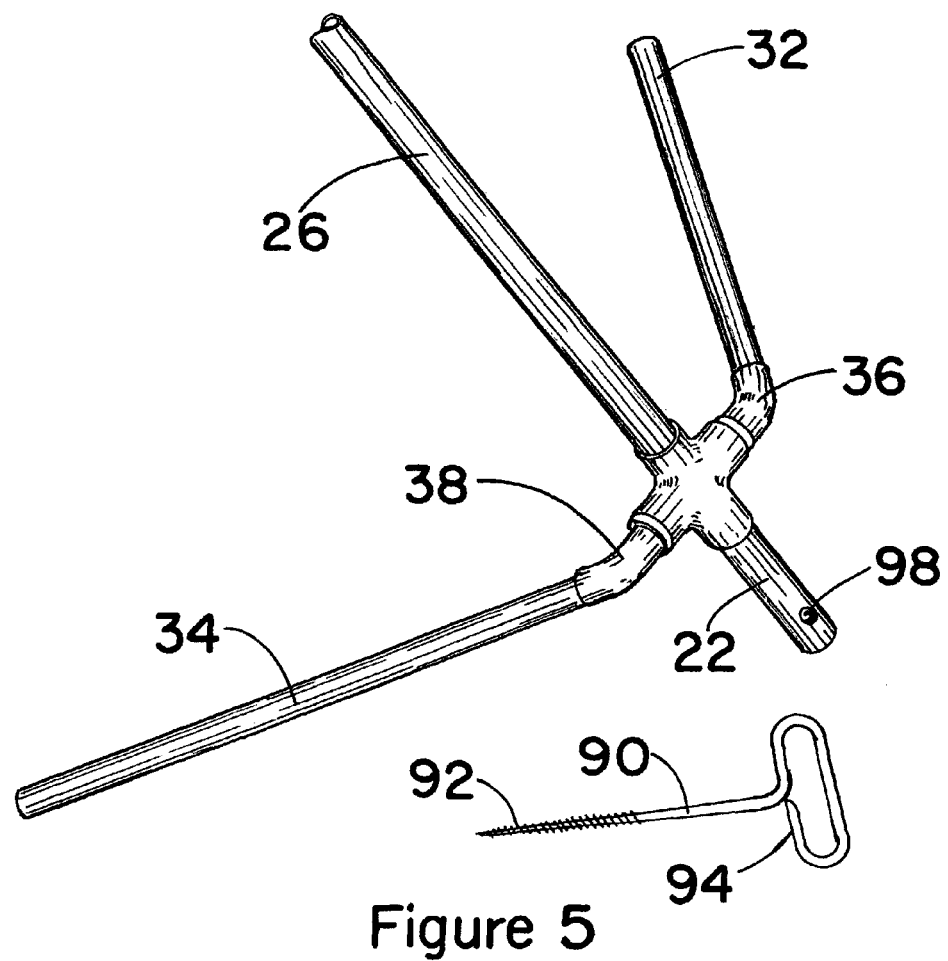
FIG. 5 is a perspective side view of the lower portion of the fishing rod holder assembly of the present invention.
Figure 6:
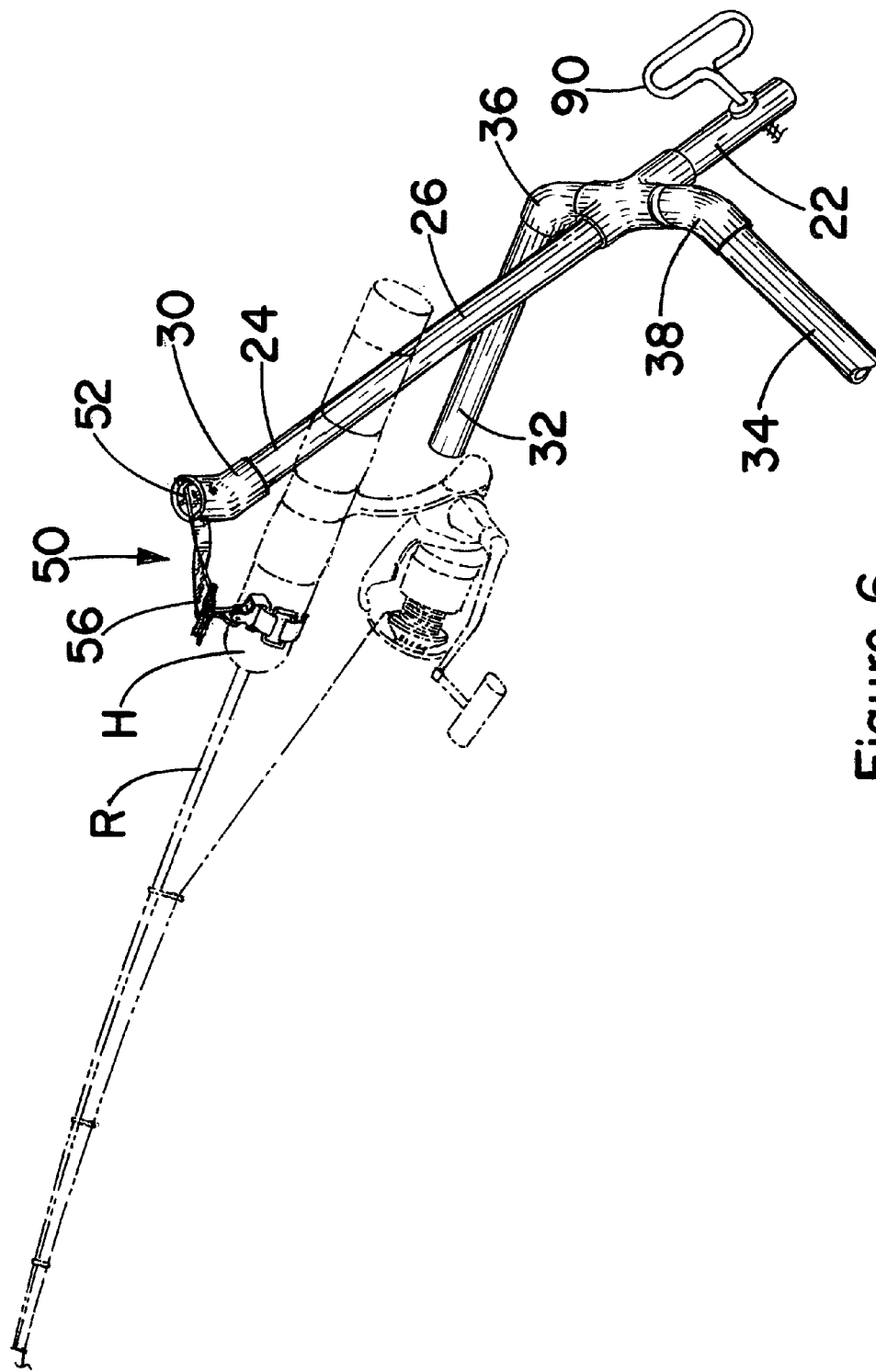
FIG. 6 is a perspective side view of a further embodiment of the fishing rod holder assembly of the present invention supporting a fishing rod and reel combination.

Because the fishing rod holder assembly 10 is preferably fabricated from light-weight PVC materials, and the supported fishing rod and reel combination adds additional weight to the upper end of the assembly 10, an anchoring member 90 with a threaded end 92 (FIG. 5) is inserted through an aperture 98 in the first end 22 of the central shaft member 20 for stability. The anchoring member 90 secures the first end 22 of the central shaft member 20 to a support surface, such as the ice of a frozen lake, as illustrated in FIG. 6. Alternatively, the anchoring member 90 can be secured to a boat dock or to the bank of a lake or stream to maintain the fishing rod holder assembly in an upright, non-vertical orientation.

In use, a fishing rod R is pivotally secured at the handle portion H by the strap member 80 to the central leg section 74 of the T-shaped hanger member 70, supported by the forked end 56 of the rod support arm member 50. The fishing rod R, held in a horizontal orientation, is free to pivot up and down relative to the T-shaped hanger member 70, via the pivot pin 84 of the connector unit 82 secured to the strap member 80. A fisherman, grasping the fishing rod handle H in response to a fish biting the bait, raises the fishing rod and reel combination, thereby disengaging the T-shaped hanger member 70 from the forked end 56 of the rod support arm member 50 and pivoting the rod support arm member 56 to a vertical orientation. The strap member 80 and attached T-shaped hanger member 70, secured to the fishing rod handle H, do not interfere with the use of the fishing rod and reel combination in playing and landing the hooked fish.

While the invention has been particularly shown and described with reference to preferred embodiments thereof, it will be understood by those skilled in the art that various changes in form and details may be made therein without departing from the spirit and scope of the invention.

I claim:

1. A fishing rod holder assembly for supporting a fishing rod in a horizontal orientation comprising:

a linear central shaft member having first and second ends;

first and second adjustable, nonlinear, support leg members secured in mutual opposition adjacent the first end of the central shaft member, the support leg members maintaining the central shaft member in a non-vertical orientation;

a third support leg member pivotally attached at about a midpoint of the central shaft member and extendable to contact a support surface between the first and second support leg members;

a rod support arm member pivotally secured at a first end thereof within a vertical slot in the second end of the central shaft member, a second end of the rod support arm member including a forked end with finger sections in a plane essentially perpendicular to the vertical slot of the central shaft member; and a T-shaped hanger member supported by the forked end of the support arm member with a central leg section extending vertically there below, the central leg section of the hanger member pivotally secured to a strap member adapted for engaging a handle of a fishing pole;

whereby a fishing pole is pivotally secured by the strap member to the central leg section of the T-shaped hanger member supported by the forked end of the support arm member, the fishing pole held in a horizontal orientation is free to pivot up and down relative to the T-shaped hanger member, and whereby a fisherman, grasping the fishing pole in response to a fish biting the bait, raises the fishing pole, thereby disengaging the T-shaped hanger member from the forked end of the support arm member and pivoting the rod support arm member to a vertical orientation.

2. The fishing rod holder assembly for supporting a fishing rod in a horizontal orientation of claim 1, wherein the central shaft member includes at least two telescoping sections.

3. The fishing rod holder assembly for supporting a fishing rod in a horizontal orientation of claim 1, wherein the second end of the central shaft member includes an offset end section containing the vertical slot therein.

4. The fishing rod holder assembly for supporting a fishing rod in a horizontal orientation of claim 1, further including an anchoring member with a threaded end, and wherein the first end of the central shaft member includes an aperture there through for receiving the anchoring member, thereby securing the first end of the central shaft member to a support surface.

5. The fishing rod holder assembly for supporting a fishing rod in a horizontal orientation of claim 1, wherein the first and second support leg members each include an independently adjustable elbow section.

6. The fishing rod holder assembly for supporting a fishing rod in a horizontal orientation of claim 1, wherein the rod support arm member includes the first end being planar and secured within the vertical slot with the forked second end of the rod support member perpendicular to the first end thereof.

7. The fishing rod holder assembly for supporting a fishing rod in a horizontal orientation of claim 1, wherein the finger sections of the forked end of the rod support arm member are curved to retain the T-shaped hanger member therein.

8. The fishing rod holder assembly for supporting a fishing rod in a horizontal orientation of claim 1, wherein the strap member secured to the T-shaped hanger member includes hook and loop tape for fastening the strap member to the handle of the fishing pole.

9. A fishing rod holder assembly for supporting a fishing rod in a horizontal orientation comprising:

a central shaft member including at least two telescoping sections and having first and second ends;

first and second adjustable, nonlinear, support leg members secured in mutual opposition adjacent the first end of the central shaft member, the support leg members maintaining the central shaft member in a non-vertical orientation;

a third support leg member pivotally attached at about a midpoint of the central shaft member and extendable to contact a support surface between the first and second support leg members;

a rod support arm member pivotally secured at a first, planar end thereof within a vertical slot in the second end of the central shaft member, a second end of the rod support arm member being planar and perpendicular to the first planar end thereof, the second end of the arm member including a forked end with finger sections thereon; and a T-shaped hanger member supported by the forked end of the support arm member with a central leg section extending vertically there below, the central leg section of the hanger member pivotally secured to a strap member adapted for engaging a handle of a fishing pole;

whereby a fishing pole is pivotally secured by the strap member to the central leg section of the T-shaped hanger member supported by the forked end of the support arm member, the fishing pole held in a horizontal orientation is free to pivot up and down relative to the T-shaped hanger member, and whereby a fisherman, grasping the fishing pole in response to a fish biting the bait, raises the fishing pole, thereby disengaging the T-shaped hanger member from the forked end of the support arm member and pivoting the rod support arm member to a vertical orientation.

10. The fishing rod holder assembly for supporting a fishing rod in a horizontal orientation of claim 9, wherein the second end of the central shaft member includes an offset end section containing the vertical slot therein.

11. The fishing rod holder assembly for supporting a fishing rod in a horizontal orientation of claim 9, further including an anchoring member with a threaded end, and wherein the first end of the central shaft member includes an aperture there through for receiving the anchoring member, thereby securing the first end of the central shaft member to a support surface.

12. The fishing rod holder assembly for supporting a fishing rod in a horizontal orientation of claim 9, wherein the first and second support leg members each include an independently adjustable elbow section.

13. The fishing rod holder assembly for supporting a fishing rod in a horizontal orientation of claim 9, wherein the finger sections of the forked end of the rod support member are curved to retain the T-shaped hanger member therein.

14. The fishing rod holder assembly for supporting a fishing rod in a horizontal orientation of claim 9, wherein the strap member secured to the T-shaped hanger member includes hook and loop tape for fastening the strap member to the handle of the fishing pole.

15. A fishing rod holder assembly for supporting a fishing rod in a horizontal orientation comprising:

a central shaft member including at least two telescoping sections and having first and second ends;

first and second adjustable, nonlinear, support leg members secured in mutual opposition adjacent the first end of the central shaft member, the support leg members maintaining the central shaft member in a non-vertical orientation;

a third support leg member pivotally attached at about a midpoint of the central shaft member and extendable to contact a support surface between the first and second support leg members;

a rod support arm member pivotally secured at a first, planar end thereof within a vertical slot in an offset section of the second end of the central shaft member, a second end of the rod support arm member being planar and perpendicular to the first planar end thereof, and including a forked end with finger sections thereon;

an anchoring member with a threaded end, the first end of the central shaft member including an aperture there through for receiving the anchoring member, thereby securing the first end of the central shaft member to a support surface; and a T-shaped hanger member supported by the forked end of the support arm member with a central leg section extending vertically there below, the central leg section of the hanger member pivotally secured to a strap member adapted for engaging a handle of a fishing pole;

whereby a fishing pole is pivotally secured by the strap member to the central leg section of the T-shaped hanger member supported by the forked end of the support arm member, the fishing pole held in a horizontal orientation is free to pivot up and down relative to the T-shaped hanger member, and whereby a fisherman, grasping the fishing pole in response to a fish biting the bait, raises the fishing pole, thereby disengaging the T-shaped hanger member from the forked end of the support arm member and pivoting the rod support arm member to a vertical orientation.

16. The fishing rod holder assembly for supporting a fishing rod in a horizontal orientation of claim 15, wherein the first and second support leg members each include an independently adjustable elbow section.

17. The fishing rod holder assembly for supporting a fishing rod in a horizontal orientation of claim 15, wherein the finger sections of the forked end of the rod support member are curved to retain the T-shaped hanger member therein.

18. The fishing rod holder assembly for supporting a fishing rod in a horizontal orientation of claim 15, wherein the strap member secured to the T-shaped hanger member includes hook and loop tape for fastening the strap member to the handle of the fishing pole.

* * * * *